United States Patent
Bojer et al.

(10) Patent No.: US 7,010,152 B2
(45) Date of Patent: Mar. 7, 2006

(54) RADIOGRAPHIC IMAGE COMPOSITION AND USE

(75) Inventors: Ivan Bojer, San Jose, CA (US); Alexander Leonidovich Berestov, San Jose, CA (US); Autumn Claire Spaulding, Maple City, MI (US)

(73) Assignee: Canon Kabushiki Kaisha, Tokyo (JP)

( * ) Notice: Subject to any disclaimer, the term of this patent is extended or adjusted under 35 U.S.C. 154(b) by 676 days.

(21) Appl. No.: 10/051,038

(22) Filed: Jan. 22, 2002

(65) Prior Publication Data

US 2003/0138137 A1 Jul. 24, 2003

(51) Int. Cl.
*G06K 9/00* (2006.01)

(52) U.S. Cl. .................. 382/132; 382/199; 382/256; 382/294

(58) Field of Classification Search ............... 382/132, 382/171, 175, 178, 275, 282, 284, 199, 256, 382/294; 128/922; 378/37, 174; 250/370.08
See application file for complete search history.

(56) References Cited

U.S. PATENT DOCUMENTS

| | | | | |
|---|---|---|---|---|
| 5,475,212 A | | 12/1995 | Nelson et al. ........... 250/208.1 |
| 5,712,629 A | * | 1/1998 | Curtiss et al. ........... 340/825.5 |
| 5,712,890 A | * | 1/1998 | Spivey et al. ................ 378/37 |
| 6,041,132 A | * | 3/2000 | Isaacs et al. ................ 382/100 |
| 6,078,699 A | | 6/2000 | Lobregt et al. ............. 382/284 |
| 6,181,832 B1 | | 1/2001 | Maas, III ................... 382/294 |
| 6,215,848 B1 | | 4/2001 | Linders et al. ........... 378/98.12 |
| 6,285,798 B1 | | 9/2001 | Lee ............................ 382/260 |
| 6,457,418 B1 | * | 10/2002 | Persson ....................... 104/166 |
| 6,459,094 B1 | * | 10/2002 | Wang et al. ................. 250/584 |
| 6,483,893 B1 | * | 11/2002 | Achtnig et al. .......... 378/98.12 |
| 6,793,390 B1 | * | 9/2004 | Wang et al. ................. 378/174 |
| 6,895,106 B1 | * | 5/2005 | Wang et al. ................. 382/132 |
| 2002/0044676 A1 | * | 4/2002 | Wei et al. .................... 382/132 |
| 2002/0109113 A1 | * | 8/2002 | Wang et al. ................. 250/584 |
| 2003/0048938 A1 | * | 3/2003 | Wang et al. ................. 382/132 |
| 2003/0228044 A1 | * | 12/2003 | Gopalasamy et al. ....... 382/132 |
| 2004/0071269 A1 | * | 4/2004 | Wang et al. ................. 378/174 |

OTHER PUBLICATIONS

PCT Appl. No. WO 96/15722, filed Nov. 22, 1995.
"Panoramic image retouching", panoguide.com, www.panoguide.com/technique/retouch.html (visited Nov. 14, 2001), 3 pages.
"Stitching Tips", panoguide.com, www.panoguide.com/technique/ stitching.html (visited Nov. 14, 2001), 1 page.

\* cited by examiner

*Primary Examiner*—Barry Choobin
(74) *Attorney, Agent, or Firm*—Fitzpatrick, Cella, Harper & Scinto (57) ABSTRACT

The present invention concerns the blending of plural x-ray images to form a blended composite image wherein in blending the images, a stitching boundary adjustment is determined for use in adjusting boundary pixels of the composite image, and an adjustment for other pixels that are located at some distance from the boundary is determined, wherein the adjustment for the other pixels depends on the stitching boundary adjustment and on values of the boundary pixels.

3 Claims, 7 Drawing Sheets

RADIOGRAPHIC IMAGE COMPOSITION AND USE

BACKGROUND OF THE INVENTION

1. Field of the Invention

The present invention relates to formation of a composite radiographic image from plural radiographic images, and more particularly to conforming the boundaries between the images so as to form a useful composite image.

2. Description of the Related Art

Radiographic imaging, such as x-ray imaging, has long been used for examination and diagnostic purposes. Where successive images are taken in order to provide a continuing view of a subject, it would be beneficial to be able to form a composite image from the successive images.

Prior to the digital age, radiographers manually created a composite image from successive images by laying a portion of one image over another image, attempting to visually align the images, and then taping the images together. In the resulting composite image, there are overlapped portions of the individual images. The composite image was then typically "read" using a light box. However, the overlapped image portions could differ so significantly that the overlapped portion is unusable.

With the advent of digital imaging and digital image processing, a composite digital image can be formed from successive digital images using image processing. The term "stitching" is typically used to refer to the process of melding the digital images to form a single image, and the stitching line refers to the curve at which the images are stitched together.

Techniques are known for stitching together multiple optical images such as digital photographs. A panoramic image can be created by stitching together multiple digital images, for example. Such stitching techniques attempt to blend the images at the seams to provide a "seamless" composite image. A technique for stitching x-ray images is described in International Application No. WO 96/15722, which is discussed below.

A problem that exists when stitching images concerns blending the pixel values (e.g., greylevel pixel values) along a seam or stitching line between adjacent images in order to blend the images. Where the pixel value difference is minimal, blending can be performed with minimal likelihood of introducing erroneous objects, or artifacts, into the image. However, the mismatch between the pixel values of the adjacent images can be such that blending the images becomes difficult and can result in the creation of artifacts. The latter is typically the case with radiographic images, because of the manner in which radiographic images are generated.

In other words, the problems that occur when blending radiographic images are more acute than with optical images, since the contrast (i.e., the degree to which the pixel values differ) between the images can be more extreme due at least in part to the variance in the paths of the rays at the stitching point of adjacent images.

Figure 1:
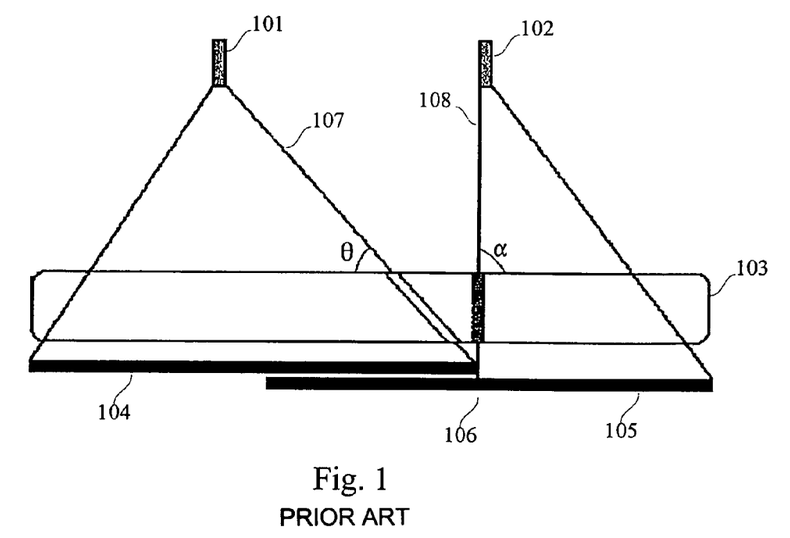
FIG. 1 provides an example of radiographic imaging using x-ray tubes.

To illustrate, FIG. 1 provides an example of radiographic imaging using x-ray tubes. X-ray tubes 101 and 102 project x-rays onto subject 103 to generate images 104 and 105, respectively. Each x-ray that is projected from one of x-ray tubes 101 and 102 travels in a path (e.g. paths 107 and 108) and encounter subject 103 at a certain angle (e.g., angles α and θ). At stitching line 106, x-ray path 107 encounters subject 103 at angle α, which differs significantly from the angle at which x-ray path 108 encounters subject 103.

The projection of an x-ray via x-ray path 107 through subject 103 is much longer than the projection of an x-ray via x-ray path 108. In addition, x-ray path 107 travels through different portions of subject 103 than x-ray path 108. Consequently, significant contrast difference between the pixel values of images 104 and 105 will likely exist at stitching line 106. As a result, as images 104 and 105 are blended, blending artifacts can be created, which reduce the usefulness of the composite image. For example, if the result of blending images 104 and 105 are used for medical diagnostics, an artifact caused by blending images 104 and 105 may result in an incorrect medical diagnosis.

Figure 2:
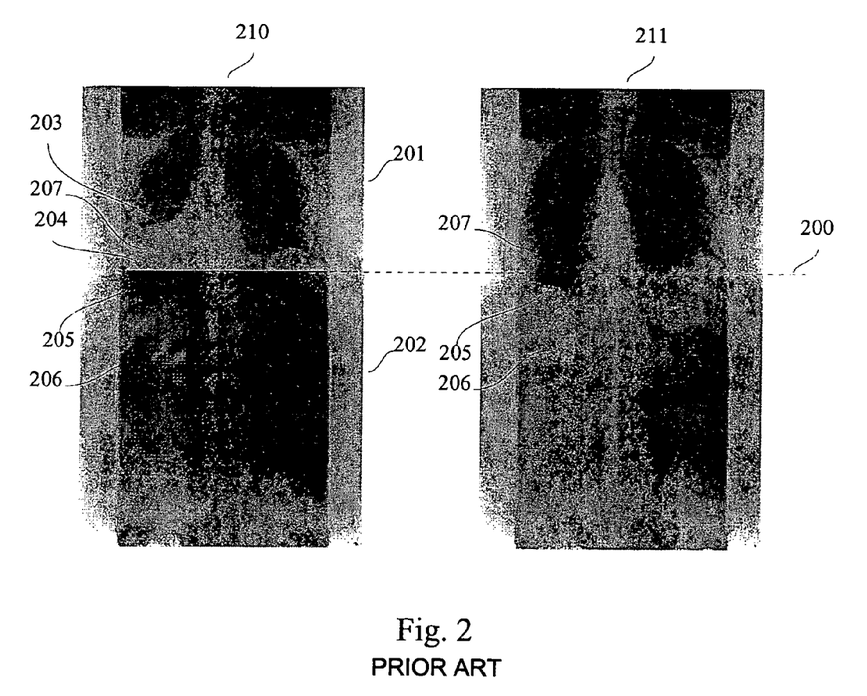
FIG. 2 depicts a composite image of two adjacent x-ray images both prior to blending and after an unsatisfactory blending of the adjacent images.

FIG. 2 depicts a composite image of two adjacent x-ray images both prior to blending and after an unsatisfactory blending of the adjacent images. Composite image 210 includes greyscale images 201 and 202. Along stitching line 200, differences in contrast exist between images 201 and 202. In general, the greylevel pixel values are homogeneously lighter along stitching line 200 in image 201 than the corresponding pixel values in image 202. In addition, region 205 consists of pixels whose greylevel values differ from the values of other pixels along stitching line 200 in image 202, and significantly differ from opposing pixels in image 201 (i.e., region 204).

Composite image 211 was generated using a blending technique, which was determined to be unsatisfactory. According to this technique, all pixels in a column of pixels shared between two images are adjusted based on the difference between pixel values at the boundary between the images.

Composite image 211, which is shown herein to illustrate a result from the technique, consists of images 201 and 202 that are blended by taking an average of the pixels on either side of stitching line 200 and linearly adjusting all of the pixels in a pixel column on both sides of stitching line 200. The pixels are adjusted based on an average of the difference between the pixels at stitching line 200. The number of pixel rows of a shared column that are adjusted is fixed regardless of the pixel values at the stitching line 200.

This blending technique is considered to be unsatisfactory, because artifacts are created as a result, which reduces the usefulness of composite image 211. For example, in order to blend images 201 and 202 at points 204 and 205, the pixels in image 201 are altered to appear darker, and the pixels in image 202 are altered to appear lighter. As a result, the pixels in region 207 are much darker in image 211 than the corresponding pixels in image 210. Similarly, the pixels in region 206 of image 211 are made to appear considerably lighter than the corresponding pixels (i.e., in region 206) in image 210. This results in a banding effect, or artifact, in regions 207 and 206 of image 211.

A fixed blending area is also used in International Application No. WO 96/15722, wherein all of the pixels within an area in which image panes overlap are normalized to blend image panes. Commencing at page twenty, WO 96/15722 describes two different techniques for determining an adjustment amount. In the first, an average is determined by taking the sum of the greylevel values of two overlapping pixels and dividing by two. According to the second described technique, a weighting is applied to the greylevel values of the two overlapping pixels based on the pixel position relative to the two images. In other words, where the pixel is at the side closest to image one, the greylevel value of image one's pixel is given a one-hundred percent weighting, and the greylevel value of image two's pixel is given a one-hundred percent weighting at the side of the overlap region closest to image two.

However, both techniques described in WO 96/15722 use a fixed linear smoothing technique that is applied to a fixed blending area (i.e., the overlap area). Consequently, blending of the image panes is unsatisfactory, since artifacts are likely to result. Further, as indicated on page twenty of WO 96/15722, the technique described therein merely results in less noticeable overlap areas. In other words, the overlap area remains visible after blending, which results in a composite image that is not smoothed across the boundaries of the individual images. In a composite x-ray image, a visible overlap area limits the usefulness of the composite image.

Thus, what is needed is a blending technique that more accurately and responsively takes into account the degree of difference between adjacent images in order to reduce the occurrence of artifacts and to produce more useful composite images.

SUMMARY OF THE INVENTION

The present invention addresses the foregoing and concerns blending of plural x-ray images to form a composite image such that pixel values are adjusted based on a difference between pixel values at boundaries between the images, wherein the adjustment is distributed over the composite image such that it is concentrated in an area closely adjacent to the boundary for large differences, and wherein the adjustment is dispersed over a wider area for small differences.

Advantageously, artifacts (e.g., banding in region 206 of FIG. 2), which are produced using other blending techniques, are not produced in the blending performed using the present invention. Accordingly, a composite image, which is generated using the present invention, provides a more useful examination and/or diagnostic instrument, and also eliminates any visible overlap area.

According to an embodiment of the invention, a method of stitching plural radiographic images is used to form a blended composite radiographic image wherein a stitching boundary adjustment for use in adjusting boundary pixels of the composite image is determined, and an adjustment for other pixels that are located at some distance from the boundary is determined, wherein the adjustment of the other pixels depends on the stitching boundary adjustment and on values of the boundary pixels.

According to another embodiment of the invention, a method is provided of blending plural radiographic images to form a blended composite radiographic image, which comprises applying a pixel value adjustment to each pixel of the composite image that is located within a stitching boundary of the composite image, and adjusting values of other pixels in the composite image that are located within an area of adjustment that is adjacent to the stitching boundary, the adjustment area is determined based on a rate of change of an adjustment amount of the other pixels, wherein the rate of change is dependent on boundary pixel values and on the pixel value adjustments made to the boundary pixels.

Another embodiment of the invention concerns a method of using a blended composite radiographic image as a diagnostic instrument, the method comprising blending plural radiographic images to form a blended composite radiographic image by applying a pixel value adjustment to each pixel of the composite image that is located within a stitching boundary of the composite image, and adjusting values of other pixels in the composite image that are located within an area of adjustment that is adjacent to the stitching boundary, the adjustment area is determined based on a rate of change of an adjustment amount of the other pixels, wherein the rate of change is dependent on boundary pixel values and on the pixel value adjustments made to the boundary pixels. The blended composite image in turn being used in examining a subject of the composite image.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 3:
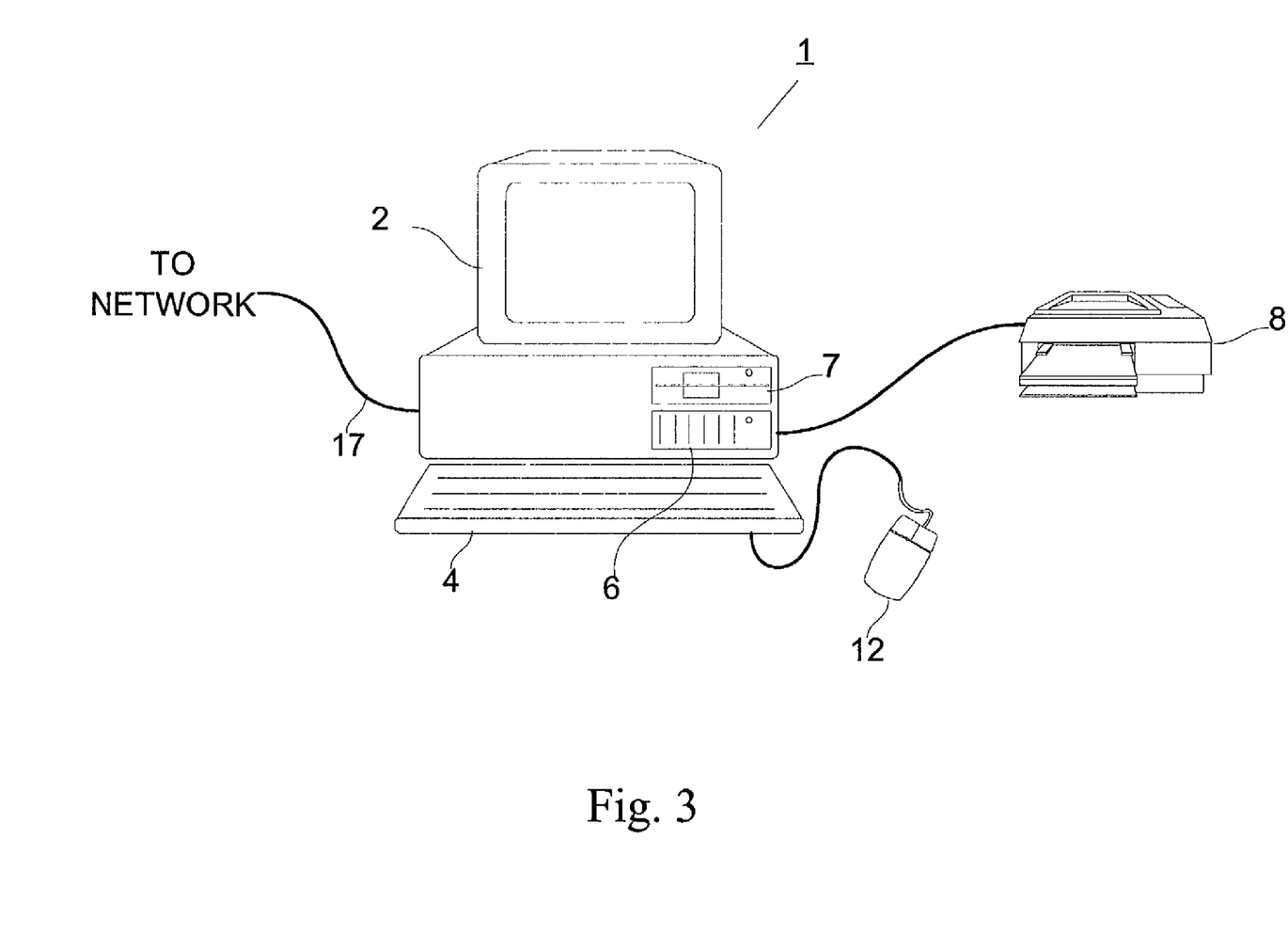
FIG. 3 is an outward view of a hardware environment embodying the present invention.

FIG. 3 is an outward view of representative computing hardware embodying the present invention. It should be apparent that the present invention is not limited to use with the computing hardware shown in FIG. 3, and that other computing hardware configurations may be used with the present invention.

Shown in FIG. 3 are computer 1 executing an operating system, such as Microsoft Windows98®, display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, such as digital image processing, word processing, graphics, and other applications as well as data files, and device drivers for controlling peripheral devices attached to computer 1, floppy disk drive 7 for use in reading data from and writing data to floppy disks inserted therein. Data and/or applications may also be accessed from a CD-ROM via a CD-ROM drive (not shown) or over a network to which computer 1 may be connected via network connection 17. Network connection 17 may connect computer 1 to any network (e.g., local or wide area network, internet, etc.) using a suitable network connection, which may include a modem (e.g., serial, cable, dsl, etc.). Floppy disk drive 7 may be used to read data from and write data to floppy disks inserted therein.

Figure 4:
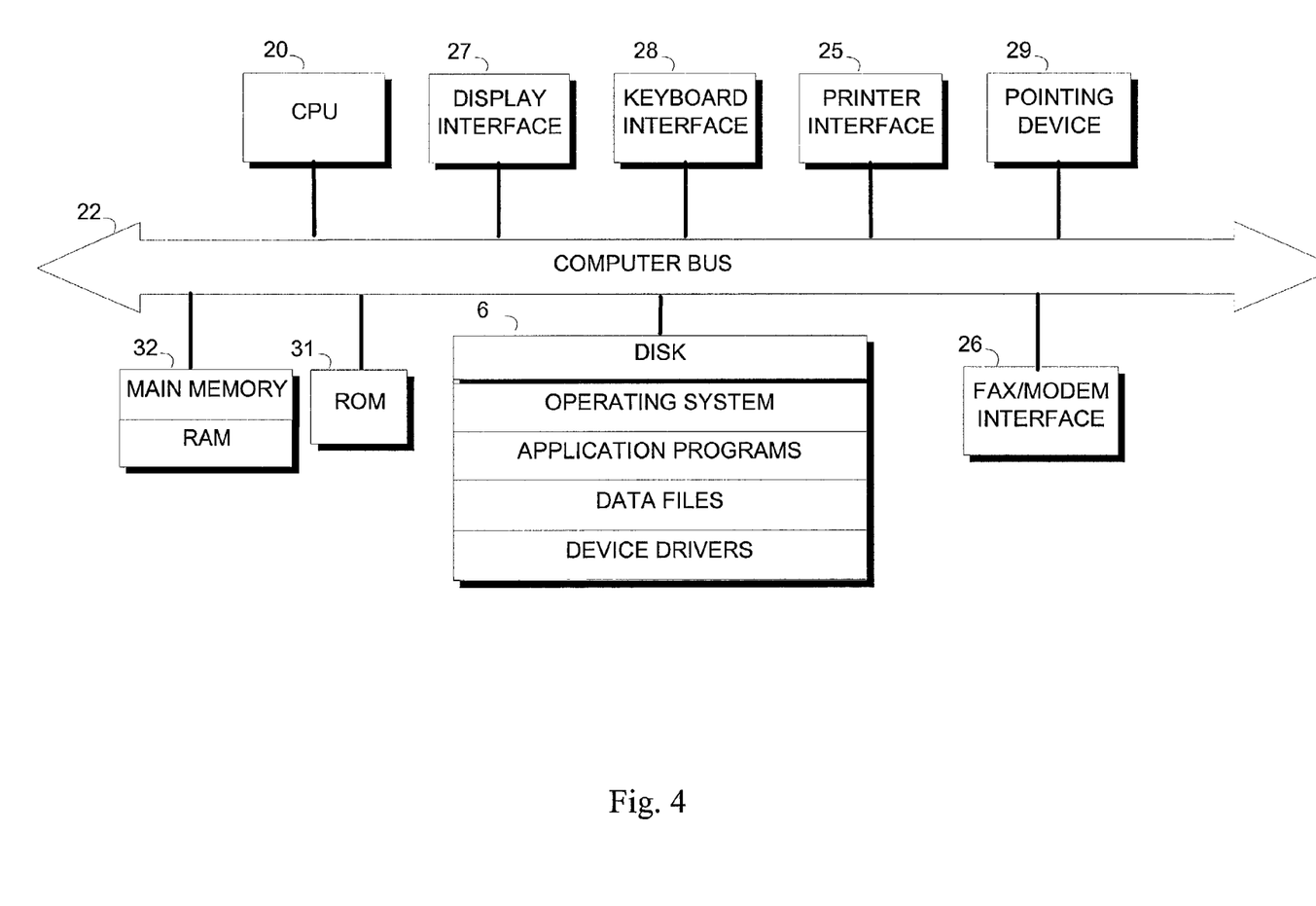
FIG. 4 is a block diagram of the internal architecture of a personal computer for use in conjunction with the present invention.

FIG. 4 is a block diagram of the internal architecture of computer 1. Shown in FIG. 4 are CPU 20, which is preferably a Pentium-type microprocessor, interfaced to computer bus 22. Also interfaced to computer bus 22 are printer interface 25, to allow computer 1 to communicate with printer 8 (in FIG. 3), modem interface 26 to enable communications between computer 1 and its internal modem, display interface 27 for interfacing with display monitor 2, keyboard interface 28 for interfacing with keyboard 4, and mouse interface 29 for interfacing with mouse 5.

Read only memory (ROM) 31 stores invariant computer-executable process steps for basic system functions such as basic I/O, start up, or reception of keystrokes from keyboard 4.

Main random access memory (RAM) 32 provides CPU 20 with memory storage which can be accessed quickly. In this regard, computer-executable process steps are transferred from disk 6 over computer bus 22 to RAM 32 and executed therefrom by CPU 20.

Also shown in FIG. 4 is disk 6 which, as described above, includes an operating system (e.g., a windowing operating system). In addition to those applications mentioned above, other applications include, but are not limited to a web browser, spreadsheet, gaming and image, etc. Disk 6 further includes data files and device drivers as shown.

Computer 1 is used to execute program code or process steps to blend digital images to form a composite digital image such that pixel value differences at boundaries between the images can be concentrated in a region closely adjacent to the boundary for large differences, and wherein the adjustment is dispersed over a wider region for small differences.

Computer 1 may be a client or a server computing system. As a server, computer 1 performs the blending, and the result is available to be downloaded to a client.

It is noted that while the present invention is described with reference to radiographic images, the present invention may be used to blend other types of images (e.g., optical images). In addition, while features of the invention are described in terms of greyscale image values, it should be apparent that the invention may be used with either chromatic and achromatic images.

Figure 5A:
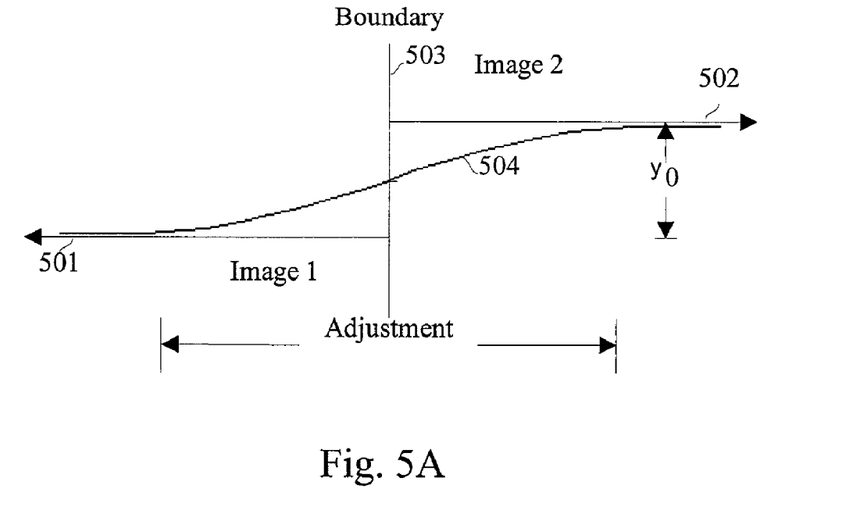
FIGS. 5A and 5B each provide a graphic example of blending two images according to the present invention.
Figure 5B:
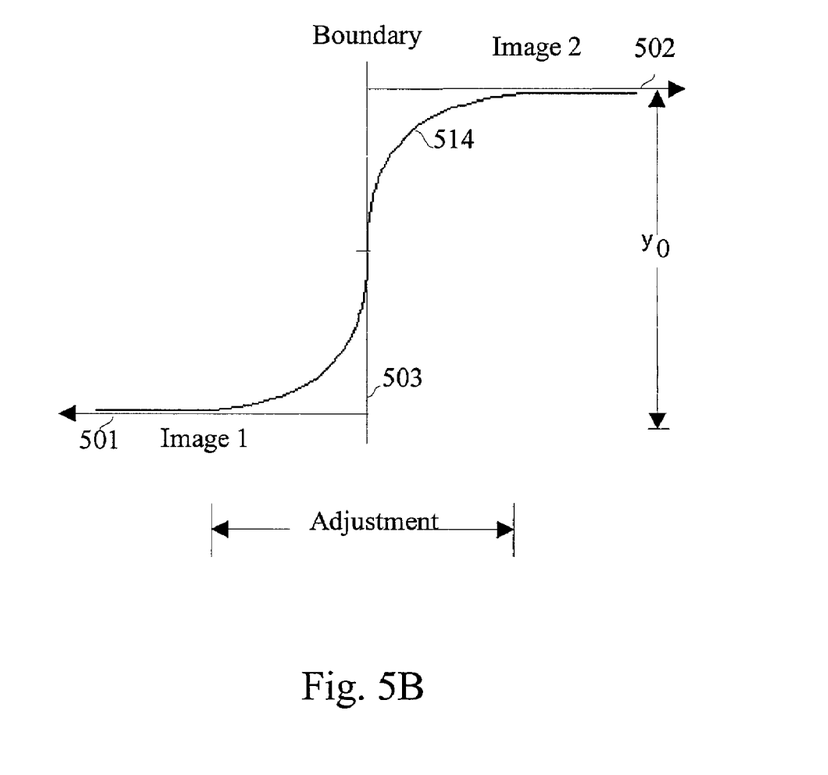

FIGS. 5A and 5B each provide a graphic example of blending two images according to the present invention. In both FIGS. 5A and 5B, points along lines 501 and 502 represent a distance within images 1 and 2 (respectively) from boundary 503, which is preferably measured in numbers of pixels, but need not be. The intersection of each of lines 501 and 502 with boundary 503 represents the value of the pixel in a single column and immediately adjacent to the stitching line between images 1 and 2. For the sake of simplicity, the values of the other pixels in the column, in either of images 1 and 2, are not shown in the graphs of FIGS. 5A and 5B. However, it should be apparent that the original values of the other pixels may be above, below or on lines 501 or 502.

The distance between lines 501 and 502 represents the difference between the values of the pixels in images 1 and 2 which are located immediately adjacent to the stitching line. The distance, which is also referred to as the pixel value difference, is denoted by $y_0$.

Graphs 504 and 514 provide a graphic illustration of an area of adjustment and corresponding pixel values at the stitching boundary. As can be seen from a comparison of FIGS. 5A and 5B, the area of adjustment becomes wider as a pixel value difference, $y_0$, decreases, and vice versa. In other words, as the pixel value difference, $y_0$, decreases, the blending adjustment is dispersed over a wider region. Conversely, as the pixel value difference, $y_0$, increases, the adjustment is more concentrated relative to the boundary in a boundary-adjacent adjustment region.

By varying the adjustment area based on pixel value difference(s), it is possible to avoid the introduction of artifacts during the image blending process. Referring to FIG. 2 and as described above, a banding artifact, which is evident in regions 206 and 207 in image 211, is introduced when blending images 201 and 202 of composite image 210, if the area of adjustment is not allowed to vary as a function of stitching boundary pixel values and stitching boundary adjustment.

Figure 6:
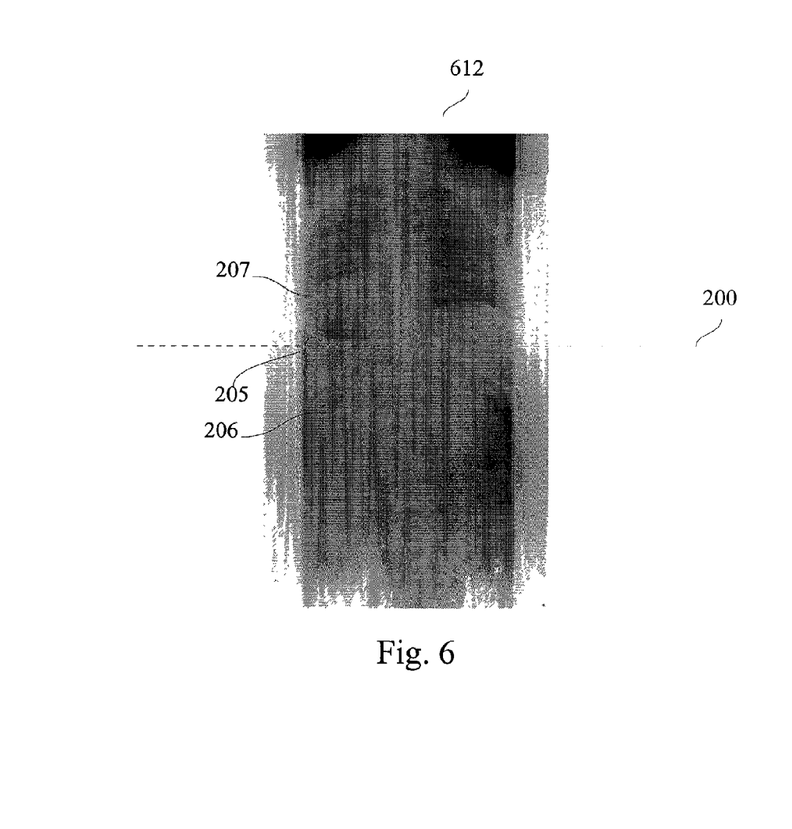
FIG. 6 illustrates a blending result achieved by varying adjustment of pixels at some distance from a stitching boundary based on an adjustment at a stitching boundary and on pixel values at the stitching boundary according to the present invention.

Composite image 612 of FIG. 6, which shows the improvement over image 211 of FIG. 2, illustrates a blending result achieved by varying the area of adjustment based on the stitching boundary pixel values and adjustment according to the present invention. The banding seen in regions 206 and 207 of image 211, in FIG. 2, is not visible in regions 206 and 207 of image 612, in FIG. 6. Further, region 205, which is a discrete object (i.e., the liver) in image 210, remains discrete in image 612. Because of the banding in image 211, the object is blended in, which makes it very difficult to identify. Thus, it can be seen that image 612 more closely resembles image 210 than does image 211.

Figure 8:
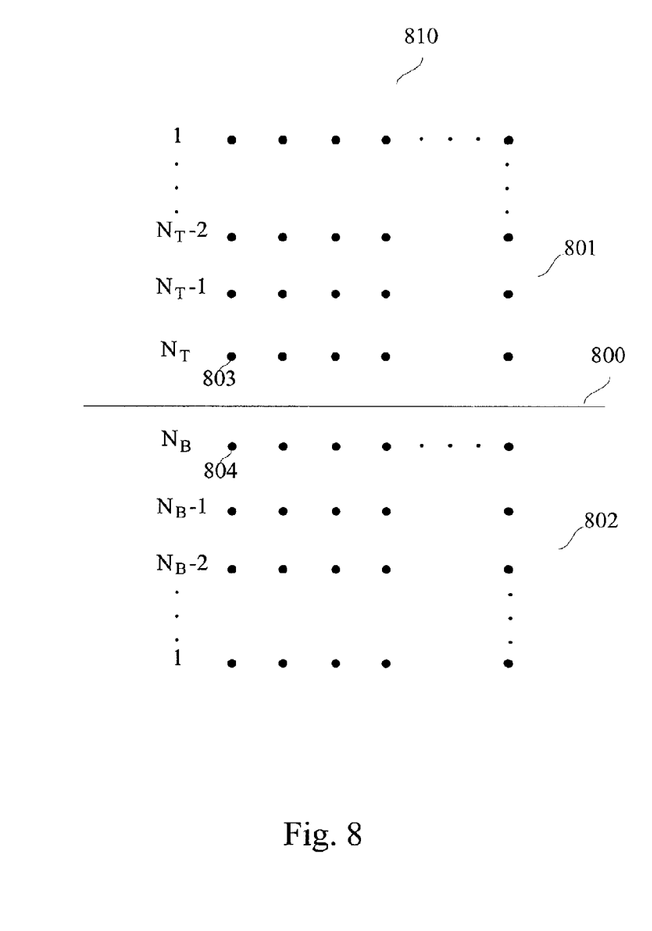
FIG. 8 illustrates two images that form a composite image 810 according to the present invention.

FIG. 8 illustrates two images, images 801 and 802, that form composite image 810. In the example of FIG. 8, the pixels (e.g., pixels 803 of image 801 and 804 of image 802) are arranged in column and row orientation, and stitching line 800 runs horizontally between images 801 and 802. It should be noted that it is not necessary that the stitching line be horizontal. The stitching line may be vertical, diagonal, curved, etc.

In each of images 801 and 802, the pixels are arranged in columns (i.e., columns 1 to X) and rows (i.e., rows 1 to $N_T$ in image 801 and rows 1 to $N_B$ in image 802). Each black dot represents a pixel of the image. To form a blended composite image, pixels of images 801 and 802 are adjusted using a variable adjustment area according to the present invention.

According to the present invention, a stitching boundary may comprise one or more rows of pixels in image 810, and pixels within the stitching boundary are adjusted by a value that may be dependent on, or independent of, pixel values within image 810. Pixels other than the stitching boundary pixels are adjusted using another adjustment amount that is determined based on the pixel adjustments made within the stitching boundary and the values of the stitching boundary pixels.

As an example, the stitching boundary may comprise rows $N_T$ and $N_B$ of images 801 and 802, respectively. The pixels in rows $N_T$ and $N_B$ are adjusted by an adjustment amount, which is either dependent or independent of the values of the pixels in rows $N_T$ and $N_B$. The pixels that are outside of the stitching boundary and that are within an adjustment area that is based on the boundary pixel values and the boundary pixel adjustments are in turn adjusted. As is described in more detail below, the adjustment area and the adjustment amount of the pixels within the adjustment area is determined by a blending function, which may be the same for all images of the composite or may be different.

Figure 7:
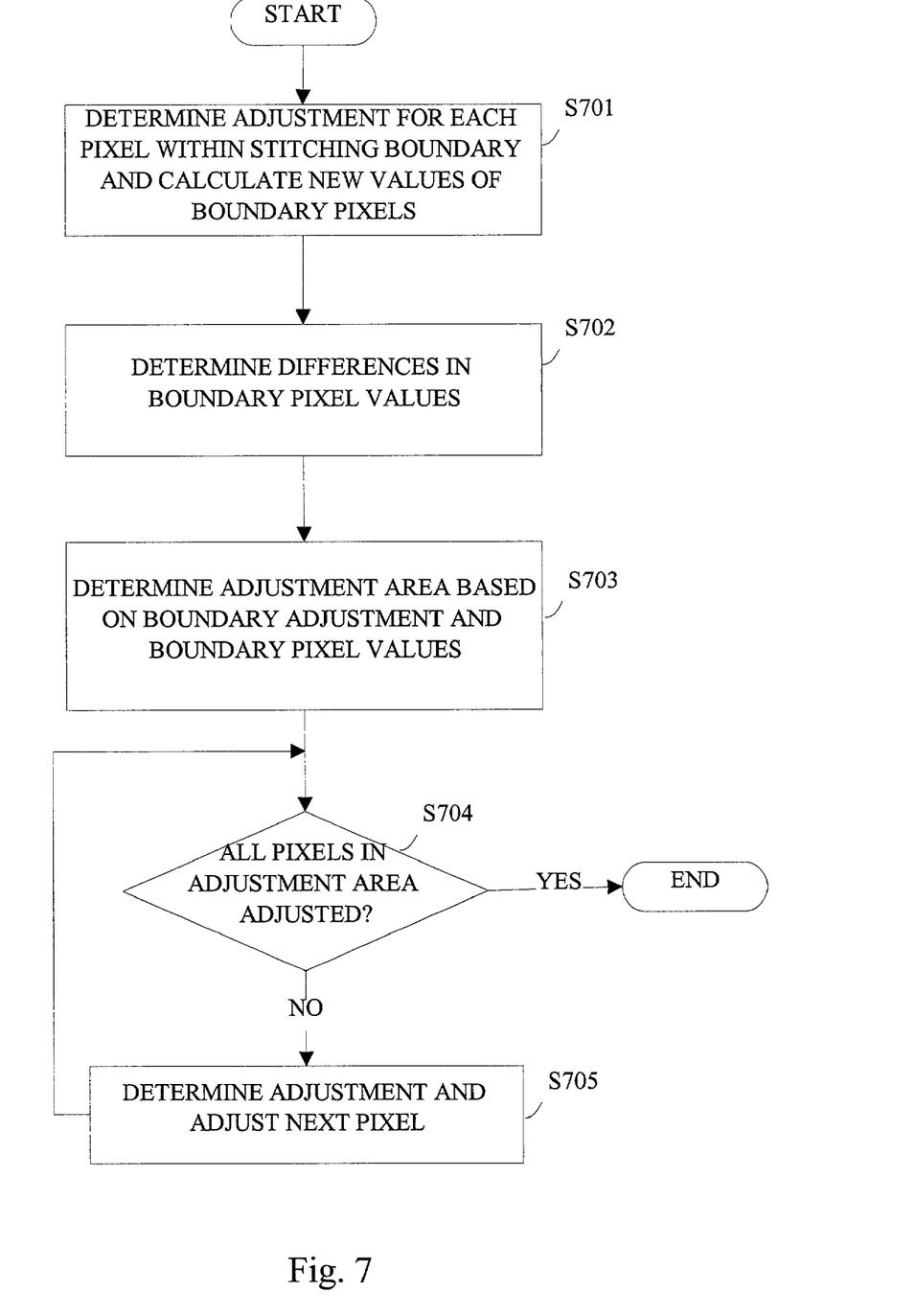
FIG. 7 illustrates a flow diagram of process steps used to adjust pixels in a composite image according to the present invention.

FIG. 7 illustrates a flow diagram of process steps used to adjust pixels in a composite image according to the present invention.

At step S701, a boundary adjustment is determined for each of the pixels within the stitching boundary, and the new values for the boundary pixels is calculated. At step S702 a pixel value difference is determined for the boundary pixels preferably using the new values for the boundary. Referring to FIG. 8, a pixel value difference is determined using the values (e.g., greyscale values) of the pixels in column 1, rows $N_T$ and $N_B$ of images 801 and 802 (i.e., pixels 803 and 804). A pixel value difference is determined for each of columns one to X using step S702.

At step S703, the area of adjustment is determined based on the boundary adjustments made in step S701 and the boundary pixel values. In a preferred embodiment, the area of the adjustment is determined using a non-linear function, which determines a rate of change in adjustment amounts used to adjust the pixels outside of the stitching boundary. The following is an example of an equation that may be used with the present invention to adjust pixels located within some distance of the stitching boundary, or adjustment area:

$$p\_corr(n) = p\_orig(n) - \left[p\_bound \times \left\{\frac{n - L(|p_1 - p_2|)}{N - L(|p_1 - p_2|)}\right\}^{m(|p_1 - p_2|)}\right], \quad (1)$$

$$n = L, \ldots, N - 1,$$

where p_corr(n) and p_orig(n) represent the corrected and original (respectively) values of the pixel in the $n^{th}$ row, p_bound represents the adjustment made to the boundary pixels that correspond to the pixel being adjusted (e.g., the boundary pixels within the same column), and $y_0$ (i.e., the pixel value difference) is represented by the difference between the value of the pixel in the current image, $p_1$, and the value of the corresponding pixel in the other image, $p_2$.

The adjustment made to the boundary pixels, p_bound, may be based on the values of the boundary pixels. For example, p_bound may be determined using the following:

$$p\_bound(n) = \frac{p_1 - p_2}{2}, \quad (2)$$

$$n = N,$$

which determines the average of the difference of the boundary pixels (e.g., pixels 803 and 804 of FIG. 8).

An equation other than equation two above may be used to determine a value of p_bound, which is dependent on the values of the boundary pixels. Alternatively, another equation may be used, which determines a value for p_bound independent of the values of the boundary pixels.

N represents the total number of rows of the image (e.g., $N_T$ of image 801 and $N_B$ of image 802), and corresponds to a stitching row (i.e., the row of pixels in each image, which is immediately adjacent to the stitching line), and L is used to determine a size of a boundary-adjacent region (e.g., a number of rows of pixels), to be adjusted in the image. In image 802 of FIG. 8, for example, L preferably ranges in value from zero (as a maximum value) to $N_B$ minus one (as a minimum value). L may vary in value as a function of $y_0$. In addition, an adjustment variable, m, may vary as a function of $y_0$.

Figure 9A:
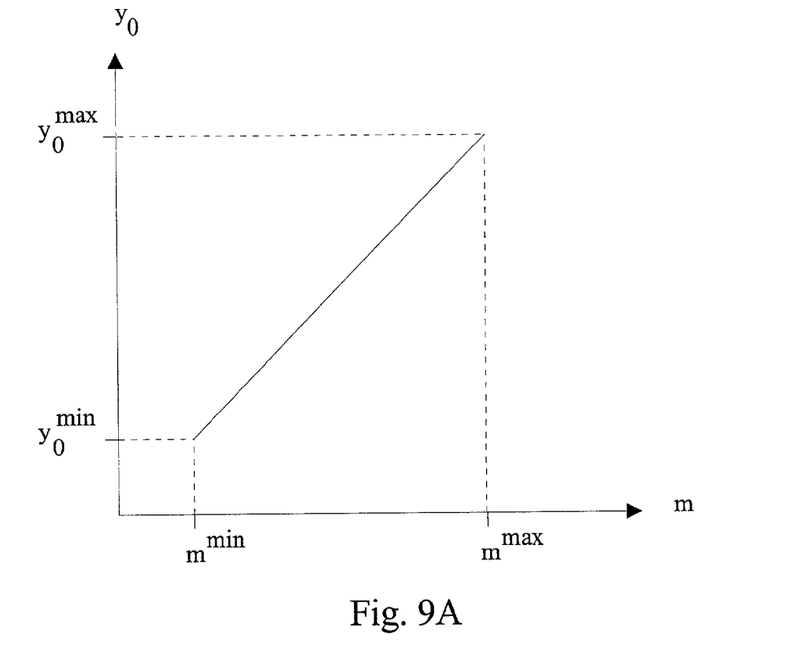
FIGS. 9A and 9B illustrate relationships between pixel value difference and an exponential variable and boundary-adjacent region variable according to the present invention.
Figure 9B:
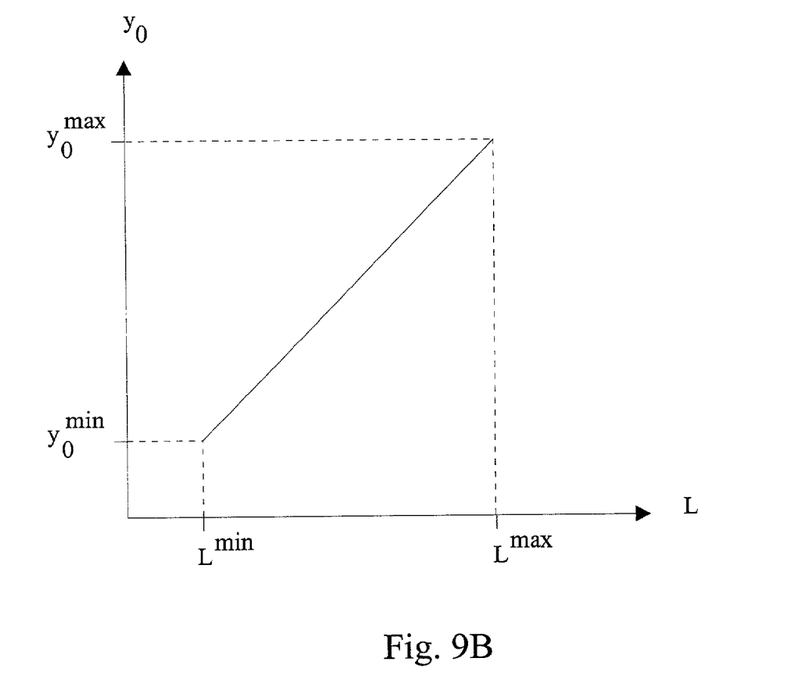

In equation one, the area of adjustment is varied by varying a rate of change which is based on one or both of variables L and m. FIGS. 9A and 9B illustrate relationships between pixel value difference, adjustment variable, m, and region-size variable, L, according to the present invention.

Referring to FIG. 9A, each of pixel value differences, $y_0$, which are calculated in step S702 of FIG. 7, fall somewhere along the y-axis, and have a corresponding m value such that as $y_0$ increases, m increases. That is, m varies in a range from a minimum value to a maximum value based on the value of $y_0$. Similarly and with reference to FIG. 9B, as $y_0$ increases, L increases. Thus, L can vary within a range from a minimum value to a maximum value based on the value of $y_0$.

As $y_0$ approaches its maximum value, m and L approach their maximum values, and as $y_0$ approaches its minimum value, m and L approach their minimum. As $y_0$, m and L approach their maximum values, the area of adjustment increases so as to concentrate the adjustment in a more closely adjacent region with respect to a boundary (e.g., stitching lines 200 or 800). Conversely as $y_0$, m and L approach their minimum values, the area of adjustment decreases so as to disperse the adjustment in a wider region with respect to the boundary. Consequently, it can be said that as the pixel value difference increases, the area of the adjustment decreases, and, conversely, as the pixel value difference decreases, the adjustment area increases.

Referring again to FIG. 7, at step S703, if L is variable, a value for L is determined based on the relationship indicated in FIG. 9B, and the area of adjustment is determined, in whole or in part, by varying L based on the pixel value difference. Similarly, if m is variable, a value for m is determined based on the relationship indicated in FIG. 9A, and the area of adjustment is determined, in whole or in part, by varying m based on the pixel value difference.

At step S704, a determination is made whether all of the pixels in the adjustment area have been adjusted. If so, processing ends. If not, processing continues at step S705.

At step S705, an adjustment is calculated using a blending equation, such as equation one, and applied to the original value of the pixel to obtain a corrected, or adjusted, value of the pixel.

The adjustment area that is calculated in step S703 will likely vary from one pixel column to the next. In addition, while it is preferable to use the same adjustment area for all of the images, this need not be the case. It is possible to use different adjustment equations for each image, for example.

In equation one, the adjustment is calculated for a given row, n, a total number of rows of the image, N, a value of the region size variable, L, as determined in step S703, and a value for adjustment variable, m, which is also determined in step S703, where one or both of L and m vary as a function of $y_0$.

With regard to equation one, it is preferable to use values of 1, m or both, so that the amount of the adjustment decreases as the distance from the boundary increases. In FIG. 8, for example, an adjustment made to a pixel in row $N_B$-1 of image 802 is greater than an adjustment made to a pixel in row $N_B$-2, where the adjustment decreases as the distance from the boundary increases. In addition, by varying one or both of m and L based on the pixel value difference, the rate at which the adjustment amount decreases varies such that the rate of decrease in the adjustment amount increases as the pixel value difference increases, and the rate of decrease in the adjustment amount decreases as the pixel value difference decreases.

By way of example only, image 612 of FIG. 6 was generated using equation one, wherein L was set to its maximum value (e.g., zero) regardless of the pixel value difference, and m varied linearly across a range of values from a maximum of eight to a minimum of one-eighth based on the pixel value difference. That is, for each column of pixels, each pixel within the column was adjusted using equation one, wherein m varied based on the pixel value difference for that column, as determined in step S701.

It should be noted that while equation one is an exponential function, other linear or non-linear function may be used with the present invention. In addition, it should be apparent that more than one blending function may be used to blend images. For example, a different blending function may be used with image 801 than with image 802 to blend images 801 and 802 of FIG. 8.

The steps of the process flow of FIG. 7 are repeated for each column of pixels of the composite image (i.e., columns one to X of FIG. 8). Preferably, step S701 is performed for all columns prior to proceeding to step S702, but need not be.

While the steps of FIG. 7 are described with reference to rows and columns, it should be apparent that the region in which an adjustment is made need not be row- and/or column-based.

The steps of FIG. 7 may be used to blend color images as well as achromatic (e.g., greyscale) images. One approach to generating a blended color image using the present invention is to perform the steps of FIG. 7 for each color channel in a multi-channel color definition. For example, where a color is defined in an RGB (Red, Green and Blue) color space, the steps of FIG. 7 are performed one for each of the three color channels (i.e., once for each of the red, green and blue components) to define a pixel's color.

The blended image that results from the application of the present invention can be used in many applications. To name just a few, a blended image according to the present invention can be used in the medical field for non-intrusive examination and diagnosis as well as in an industrial environment for non-destructive test purposes. In the medical field, diagnosis can be made of organs and bone structures that span multiple x-rays. A composite image can provide a continuous view of the spine or a hip-to-foot continuous view, for example.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method of blending plural radiographic images to form a blended composite radiographic image comprising:
applying a pixel value adjustment to each pixel of the composite image that is located within a stitching boundary of the composite image; and
adjusting values of other pixels in the composite image that are located within an area of adjustment that is adjacent to the stitching boundary, the adjustment area is determined based on a rate of change of an adjustment amount of the other pixels,
wherein the rate of change is dependent on boundary pixel values and on the pixel value adjustment made to the boundary pixels,
and wherein the rate of change is a decreasing rate.

2. A method of blending plural radiographic images to form a blended composite radiographic image comprising:
applying a pixel value adjustment to each pixel of the composite image that is located within a stitching boundary of the composite image; and
adjusting values of other pixels in the composite image that are located within an area of adjustment that is adjacent to the stitching boundary, the adjustment area is determined based on a rate of change of an adjustment amount of the other pixels,
wherein the rate of change is dependent on boundary pixel values and on the pixel value adjustment made to the boundary pixels,
and wherein the rate of change is a decreasing rate,
and wherein the rate of decrease in the adjustment amount increases as the pixel value difference increases.

3. A method of blending plural radiographic images to form a blended composite radiographic image comprising:
applying a pixel value adjustment to each pixel of the composite image that is located within a stitching boundary of the composite image; and
adjusting values of other pixels in the composite image that are located within an area of adjustment that is adjacent to the stitching boundary, the adjustment area is determined based on a rate of change of an adjustment amount of the other pixels,
wherein the rate of change is dependent on boundary pixel values and on the pixel value adjustment made to the boundary pixels,
and wherein the rate of change is a decreasing rate,
and wherein the rate of decrease in the adjustment amount decreases as the pixel value difference decreases.

* * * * *